Jan. 12, 1965   R. FAHRBACH   3,165,273
TOROIDAL COIL WINDING APPARATUS
Original Filed May 31, 1962   2 Sheets-Sheet 1

INVENTOR.
RUDOLF FAHRBACH
BY
ATTORNEYS.

Jan. 12, 1965   R. FAHRBACH   3,165,273
TOROIDAL COIL WINDING APPARATUS
Original Filed May 31, 1962   2 Sheets-Sheet 2

INVENTOR.
RUDOLF FAHRBACH
BY Cornelius Zabriskie
ATTORNEYS.

United States Patent Office 3,165,273
Patented Jan. 12, 1965

3,165,273
TOROIDAL COIL WINDING APPARATUS
Rudolf Fahrbach, Union, N.J., assignor to Universal Manufacturing Company, Inc., Irvington, N.J., a corporation of New Jersey
Continuation of application Ser. No. 198,872, May 31, 1962. This application May 13, 1964, Ser. No. 367,050
2 Claims. (Cl. 242—4)

This application is a continuation of application Serial No. 198,872, filed May 31, 1962, now abandoned.

This invention relates to winding and reeling apparatus and is directed more particularly to the ring winding of toroidal coils.

The winding of toroidal coils has long been known. For many years, all apparatus for doing this work, other than according to this invention, employed a unitary, integrated assembly of power and winding elements which were individually and separately supported on and affixed to the frame of the winding machine. Each of these assemblies, in toto, was so constituted that it was capable of winding only a limited range of coil sizes or a particular form of coil winding. When a different size or type of coil, outside the range of the machine, was required, it became necessary to remove the winding head which happened to be in the machine and substitute therefor a different winding head capable of carrying out the newly desired operation. Such a change-over required that the winding head part of the assembly be removed from the remaining parts of the machine. This entailed unbolting of the winding head from the frame of the machine, a disconnection of the power drive therefrom, and a reassembly of the parts with an appropriate winding head, followed by a realinement and the establishment of a new connection between the prime mover and the new winding head.

The art of winding toroidal coils, particularly when wire of small gauge is employed, requires accurate assembly of the parts in order that the machine will function smoothly. Consequently, great care had to be exercised in reassembling the parts during change-over, in order that all the critical requirements of such operation would be performed. This required considerable time for shut-down of the machine before the new winding head was ready for operation. In practice, it was not uncommon that such a change-over required a shut-down of an hour or more and had to be carried out by skilled operatives.

The primary object of this invention is to so constitute toroidal coil winding machines that change-over of winding heads may be accurately accomplished by comparatively unskilled labor in less than a moment, so that shut-down for any prolonged period may be eliminated and no appreciable delay in production output of the machine may be obtained.

The fundamental concept of this invention involves the use of a novel basal power transmission unit forming an inherent component part of the machine and to which separate, transitory, individual winding heads may be selectively coupled without requiring any time consuming alignment procedure, whereby different sized winding heads may be rapidly interchanged as required during production with a consequent reduction in downtime.

The novel basal power transmission unit of this invention comprises a standard, permanently mounted in fixed position on the frame of the machine and immovably supporting a sleeve which extends beyond one end of the standard and is there proivded with coupling means. A rotatable power transmitting shaft extends through said sleeve and is provided on one end with a clutch, there being a pulley fixed to said power transmitting shaft to rotate the latter from a belt driven by a prime mover motor.

The toroidal coil winding head of this invention embodies a casting on which is supported a plurality of shuttle ring supporting and driving rolls. This casting has a tubular neck provided at its free end with coupling means engageable with the coupling means of the sleeve of the power transmitting unit to rigidly detachably support the winding head, solely on said power transmitting unit. The drive shaft of the winding head extends through said tubular neck and terminates in a clutch to detachably engage the clutch of the power transmitting shaft of the said unit. By so mounting and supporting the winding head solely on the power transmitting unit, all direct supporting connections between said head and the frame of the machine are entirely eliminated. The laborious and time consuming bolting and unbolting of the head to and from the machine is no longer necessary. Proper alignment of the respective parts is autogenously accomplished.

The coupling means which I prefer to employ to mount the winding head on the power transmission unit comprises a two-part female receptacle, one of which is fixedly supported on the basal power transmission unit and has associated therewith a relatively rotatable part. These fixed and rotatable parts are provided with shaped inner orifices into which a conformed male member, on a changeable winding head, is adapted to be received and retained. On assembly, the male member is inserted first into and through the rotatable part of the receptacle and thence into the stationary part of said receptacle. Thereafter, the rotatable part is rotated to lock the male member within the inner stationary part.

The invention will hereinafter be described in reference to the accompanying drawings, in which.

Figure 1:
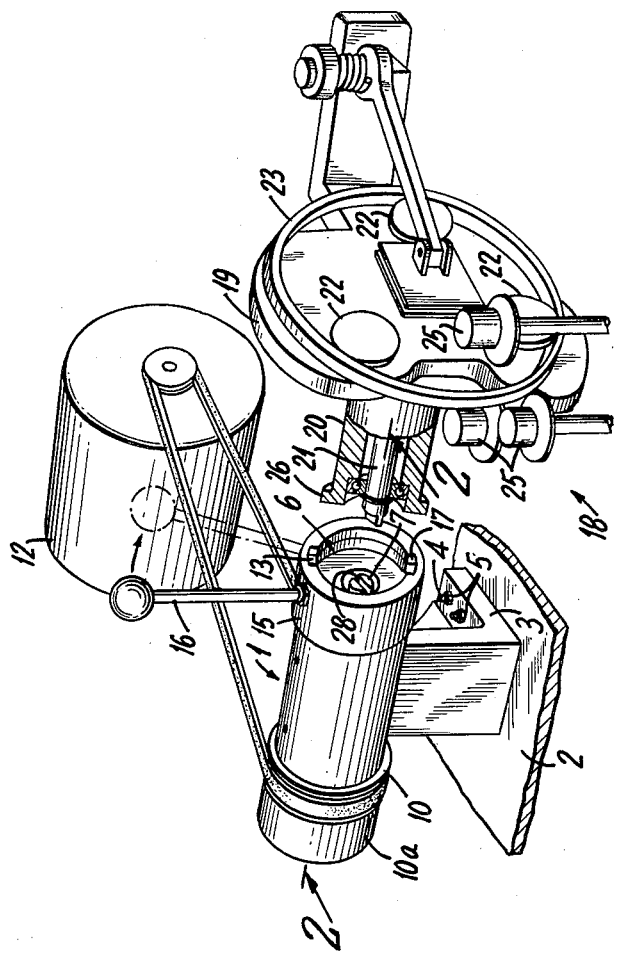
FIG. 1 is a perspective view of a toroidal coil winding machine embodying the invention, a portion of the apparatus being broken away to illustrate its action.
Figure 2:
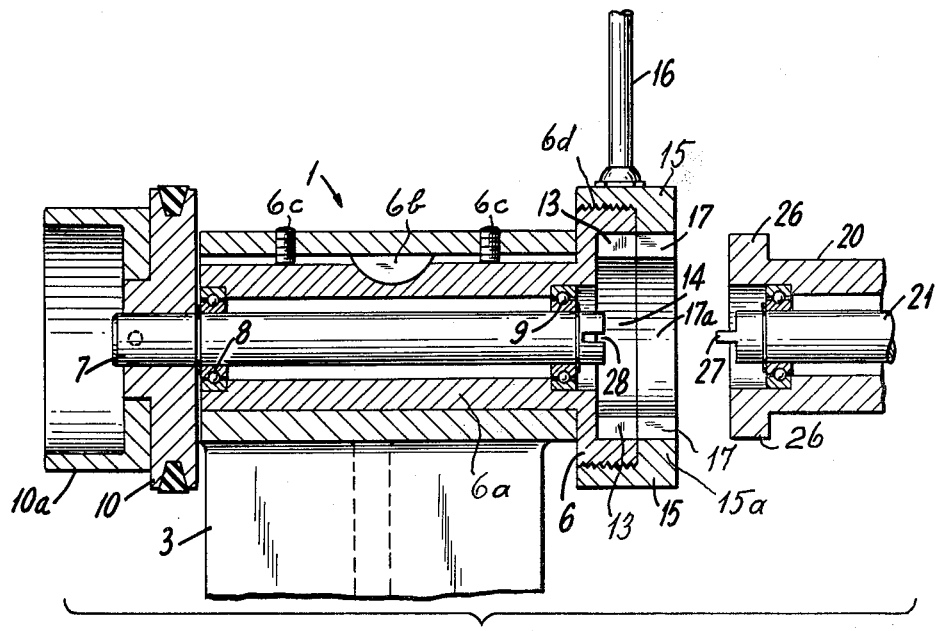
FIG. 2 is a longitudinal cross-sectional view of coupling mechanisms taken along line 2—2 of FIG. 1.
Figure 3:
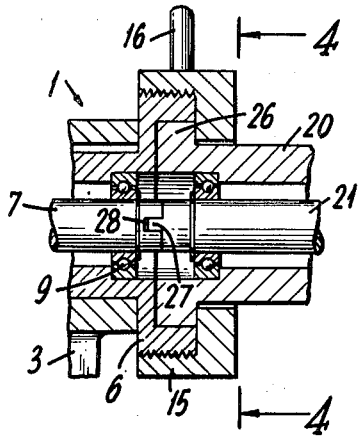
FIG. 3 is a longitudinal cross-sectional view of the members illustrated in FIG. 2 in mechanically coupled relationship.

In the drawings, the unit generally indicated at 1 is the power transmission unit, which is permanently affixed to the chassis or frame 2 of a coil winding machine. The supporting standard 3 of the unit is permanently, rigidly fastened to the frame 2 as by stud bolts 4 and nuts 5. The upper cylindrical portion of the standard 3 encloses a tubular sleeve 6a, locked in position by a spline 6b and set screws 6c. One end of the sleeve extends beyond the standard and has a radially enlarged, cylindrical, cup shaped end 6, forming therein a receptacle 14.

Within the sleeve 6a, a power transmitting shaft 7 is journaled for rotation in bearings 8 and 9. One end of this shaft 7 has driving means, in this case a pulley 10 having a hand wheel 10a. The pulley is adapted to receive a belt, driven by a prime mover motor 12.

Within the internal peripheral wall of the receptacle 14 is a pair of keyways 13 which project radially therefrom. The outer peripheral surface of the enlarged cup shaped head 6 is threaded, as at 6d, to receive an internally threaded locking ring 15, one end of which is internally flanged, as at 15a, to leave a central circular opening 17a. In the flange 15a, are formed keyways 17 adapted, in one rotary position of the ring, to conform to and register with the keyways 13.

The interchangeable winding head, of which only one form is illustrated, is generally indicated at 18. It comprises a casting 19 having a tubular neck 20 to enclose driven shaft 21. The casting 19 may contain suitable gears, or alternatively a pulley-belt system, to supply rotational energy from the driven shaft 21 to driving rollers 22 which provide driving energy for the circular shuttle 23, which these rollers support. The shuttle 23 carries the wire to be wound on the toroid, not illustrated. The toroid is adapted to be rotatably supported on the three horizontal driving rollers 25 by which it is adapted to be rotated as the wire is wound thereon by the revolving shuttle.

The outer end of the tubular neck 20 of the winding head casting 19 is provided with integral radial male projecting lugs or keys 26. The shape of these lugs or keys 26 is the converse of the shape of the keyways 13 and 17 in the receptacle 14 and locking ring 15 of the power transmission unit 1. The driven shaft 21 has a centrally projecting flat blade 27 adapted to be received in a slot 28 in the end of the power transmitting shaft 7 of the power transmission unit 1.

In operative use, the selected winding head 18 is guided towards the power transmission unit 1 so as to pass the winding head lugs or keys 26 through the keyways 17 of the locking ring 15 into the keyways 13 of the cupped end of the sleeve 6a.

Figure 4:
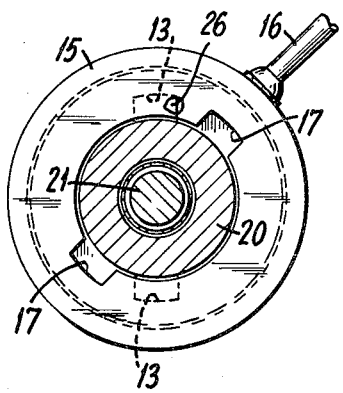
FIG. 4 is a transverse sectional view taken along line 4—4 of FIG. 3.

The power transmission shaft 7 having been oriented so that the slot 28 is aligned with the blade 27, the winding head is urged against the power transmission unit until fully seated in the latter. The locking ring 15 is thereupon rotated by the handle 16 until the key slots 17 of the locking ring 15 are out of alignment with the key slots 13 of the part 6 as illustrated in FIG. 4. As the ring 15 is rotated to lock lugs 26 to the power unit, the ring 15 moves, by the action of the threads, axially leftwardly in the drawings, locking the lugs 26 in place behind flange 15a. The interchangeable winding head is thus securely locked to the power transmission unit 1 and the coil winding operation may be commenced.

When it is desired to make the next change-over, the wiring head at that time associated with the power transmission unit may be released by merely rotating the locking ring into a position to bring the keyways 13 and 17 into registration, whereupon the winding head may be manually withdrawn from the transmission unit. The next unit which is to be coupled to the transmission unit may then be associated therewith by repeating the assembly operations hereinbefore described.

Having thus fully described the invention, what I claim as new and desire to secure by Letters Patent is:

1. A toroidal coil winding apparatus having a frame, a basal power transmission unit rigidly and permanently attached to said frame, coupling means carried by said power transmission unit, and a power transmitting shaft rotatably mounted on said unit with a clutch member on the end of said shaft, in combination with a transitory toroidal coil winding head embodying a casting carrying a plurality of shuttle ring supporting and driving rolls, a tubular neck rigid with said casting and having at its free end coupling means engageable with the coupling means of the power transmission unit to rigidly and detachably support said winding head solely on the basal power transmission unit, and a driven shaft rotatably supported within the casting of the winding head to drive the shuttle ring supporting rolls, the free end of said driven shaft having a clutch member engageable with the clutch member of the power transmitting shaft to drive said driven shaft from said power transmitting shaft.

2. A toroidal coil winding apparatus comprising: an apparatus frame, a basal power transmission unit rigidly and permanently mounted on said frame and including a hollow cylinder, a tubular sleeve positioned longitudinally within said cylinder and locked against rotation therein, one end of said sleeve extending beyond one end of the hollow cylinder and having a radially enlarged cupped portion the outer surface of the peripheral wall of which is threaded and the inner surface of which wall is provided with annularly spaced apart keyways, a threaded locking ring engaged with the threads of the cupped portion of the sleeve and having on its inner periphery keyways adapted through rotation of the locking ring to move into and out of registration with the keyways of the cupped portion of the sleeve, a power transmitting shaft extending through and rotatably supported within said sleeve, one end of said transmission shaft projecting into the cupped portion and slotted while the other end of said shaft projects beyond the opposite end of the sleeve and has a driving pulley affixed thereto, and a drive motor having a belt connection with said pulley, in combination with a toroidal coil winding head embodying a casting carrying a plurality of shuttle ring supporting and driving rolls, a tubular neck rigid with said casting and having at its free end radial lugs movable into the keyways in the cupped portion of the sleeve when the keyways of the sleeve and locking ring are in registration, to be locked to the power transmission head when the locking ring is rotated to move the keyways of said locking ring out of register with those of the cupped portion, whereby the frame of the winding head is rigidly and detachably supported solely on the transmission head, and a driven shaft rotatably supported within the casting of the winding head to drive the shuttle ring supporting rolls, the free end of said driven shaft having a blade extending into the slot of the power transmitting shaft when the winding head is locked to and supported on the power transmission head.

References Cited by the Examiner

UNITED STATES PATENTS

| | | | |
|---|---|---|---|
| 1,259,132 | 3/18 | Ritz | 64—4 X |
| 1,289,375 | 12/18 | Bright | 64—4 |
| 1,386,210 | 8/21 | Thomas | 285—386 X |
| 2,222,613 | 11/40 | Green | 64—4 |
| 2,916,221 | 12/59 | Onisko | 242—4 |
| 2,923,485 | 2/60 | Fordeck | 242—4 |

MERVIN STEIN, *Primary Examiner.*